United States Patent
Wang et al.

(10) Patent No.: US 9,900,213 B2
(45) Date of Patent: Feb. 20, 2018

(54) STARTUP CONFIGURATION FILE DEPLOYMENT

(71) Applicant: Hangzhou H3C Technologies Co., Ltd., Hangzhou (CN)

(72) Inventors: Shoufeng Wang, Beijing (CN); Dongsheng Wei, Beijing (CN); Xueming Zhang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 155 days.

(21) Appl. No.: 14/769,273

(22) PCT Filed: Oct. 22, 2013

(86) PCT No.: PCT/CN2013/085660
§ 371 (c)(1),
(2) Date: Aug. 20, 2015

(87) PCT Pub. No.: WO2014/146429
PCT Pub. Date: Sep. 25, 2014

(65) Prior Publication Data
US 2016/0006607 A1    Jan. 7, 2016

(30) Foreign Application Priority Data
Mar. 18, 2013 (CN) .......................... 2013 1 0087102

(51) Int. Cl.
*G06F 15/177* (2006.01)
*H04L 12/24* (2006.01)
(Continued)

(52) U.S. Cl.
CPC ...... *H04L 41/0806* (2013.01); *H04L 41/0809* (2013.01); *H04L 41/0886* (2013.01);
(Continued)

(58) Field of Classification Search
CPC ............ H04L 41/0806; H04L 41/0809; H04L 41/0886; H04L 61/2015; H04L 61/1582; H04L 67/06; H04L 67/08
(Continued)

(56) References Cited

U.S. PATENT DOCUMENTS

| 6,598,057 B1 * | 7/2003 | Synnestvedt | ........... H04L 29/06 |
| 7,334,258 B1 * | 2/2008 | Ford | ........................ H04L 63/10 |
| | | | 713/1 |

(Continued)

FOREIGN PATENT DOCUMENTS

| CN | 1859440 C | 11/2006 |
| CN | 1905475 | 1/2007 |

(Continued)

OTHER PUBLICATIONS

Extended European Search Report, EP Application No. 13879195.9, Date: Oct. 13, 2016, pp. 1-5, EPO.

(Continued)

*Primary Examiner* — Michael Y Won
(74) *Attorney, Agent, or Firm* — Hewlett Packard Enterprise Patent Department

(57) ABSTRACT

An auto-deployment server may receive, from a TFTP server, a notification message carrying a temporary IP address and a name of a basic configuration file obtained by the device from a DHCP server. The auto-deployment server may obtain the basic configuration file corresponding to the name of the basic configuration file from basic configuration files stored in the auto-deployment serve, may obtain a MAC address of the device according to the basic configuration file and the temporary IP address, may obtain a baseline startup configuration file of the device according to the MAC address, may deploy the baseline startup configuration (Continued)

file to the device, and may trigger the device to execute the baseline startup configuration file.

16 Claims, 3 Drawing Sheets

(51) Int. Cl.
*H04L 29/08* (2006.01)
*H04L 29/12* (2006.01)

(52) U.S. Cl.
CPC ...... *H04L 61/1582* (2013.01); *H04L 61/2015* (2013.01); *H04L 67/06* (2013.01); *H04L 67/08* (2013.01); *H04L 61/103* (2013.01)

(58) Field of Classification Search
USPC ........ 709/201, 213, 217, 220, 223, 227, 230
See application file for complete search history.

(56) References Cited

U.S. PATENT DOCUMENTS

| | | | |
|---|---|---|---|
| 9,319,300 B2* | 4/2016 | Huynh Van | H04L 45/00 |
| 9,419,842 B1* | 8/2016 | Galliher, III | H04L 29/06 |
| 2003/0033379 A1* | 2/2003 | Civanlar | H04L 29/12009 |
| | | | 709/218 |
| 2003/0088650 A1* | 5/2003 | Fassold | G06F 8/63 |
| | | | 709/220 |
| 2003/0216143 A1* | 11/2003 | Roese | G01S 5/02 |
| | | | 455/456.1 |
| 2005/0076133 A1 | 4/2005 | Kim | |
| 2007/0025306 A1* | 2/2007 | Cox | H04L 41/0806 |
| | | | 370/338 |
| 2010/0142410 A1* | 6/2010 | Huynh Van | H04L 12/4633 |
| | | | 370/255 |
| 2012/0207291 A1 | 8/2012 | West et al. | |
| 2013/0250358 A1* | 9/2013 | Suzuki | H04L 65/1069 |
| | | | 358/1.15 |

FOREIGN PATENT DOCUMENTS

| | | |
|---|---|---|
| CN | 101778136 | 7/2010 |
| CN | 102164360 B | 8/2011 |
| CN | 102307374 | 1/2012 |
| CN | 102523110 A | 6/2012 |
| CN | 102594944 B | 7/2012 |
| WO | WO-2007/010160 A2 | 1/2007 |

OTHER PUBLICATIONS

International Search Report and Written Opinion dated Jan. 30, 2014 issued on PCT Patent Application No. PCT/CN2013/085660 dated Oct. 22, 2013, The State Intellectual Property Office, P.R. China.

* cited by examiner

STARTUP CONFIGURATION FILE DEPLOYMENT

CLAIM FOR PRIORITY

The present application is a national stage filing under 35 U.S.C. §371 of PCT application number PCT/CN2013/085660, having an international filing date of Oct. 22, 2013, which claims priority to Chinese patent application number 201310087102.7, having a filing date of Mar. 18, 2013, the disclosures of which are hereby incorporated by reference in their entireties.

BACKGROUND

A newly fabricated computing device is typically shipped from a factory without being configured. As such, the newly fabricated computing device is typically processed after leaving the factory and before running on a network. The processing often includes upper bracket, power-on, and configuring basic access parameters via a console configuration interface. The access parameters may include a telnet parameter, a Simple Network Management Protocol (SNMP) parameter, etc. In addition, the computing device may be upgraded to a specified version and a baseline startup configuration file may be deployed in the computing device to make the computing device available in the network.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
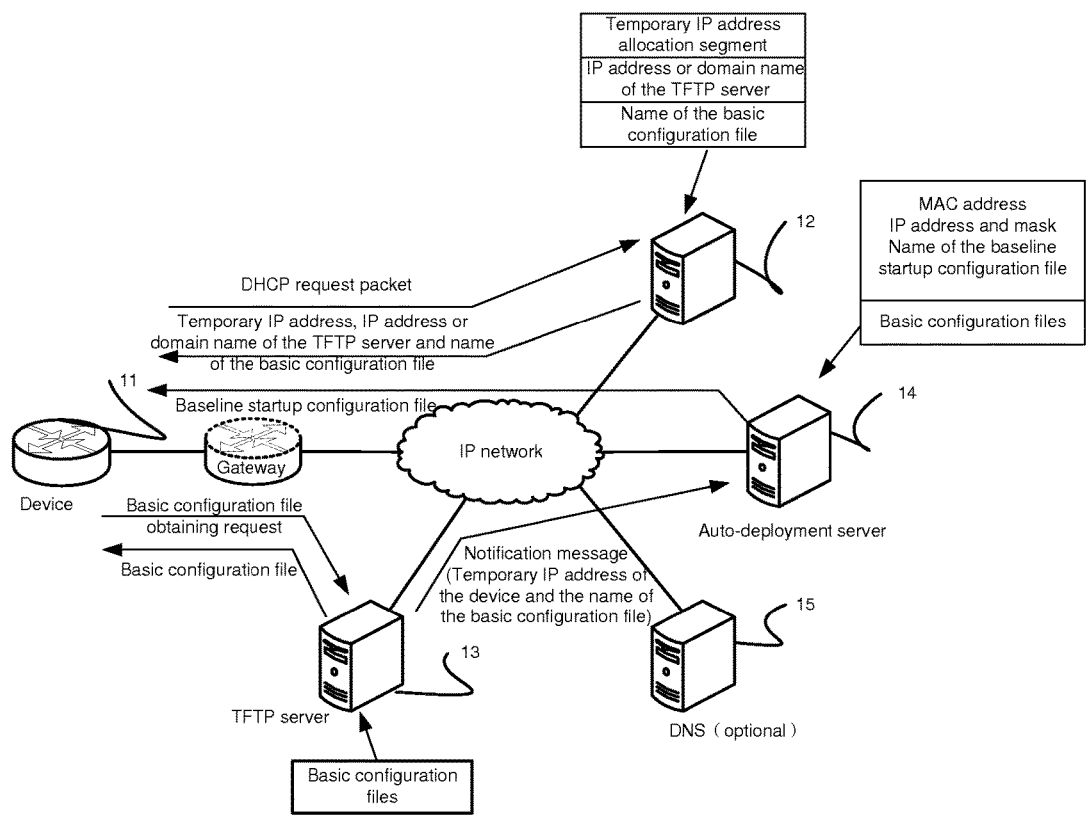
FIG. 1 is a schematic diagram illustrating a structure of an auto-deployment system in accordance with an example of the present disclosure.

For simplicity and illustrative purposes, the present disclosure is described by referring to examples. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Aspects of the disclosed technology may allow automatically deploying a device. An example method of automatically deploying a device may include receiving, by an auto-deployment server, from a Trivial File Transfer Protocol (TFTP) server, a notification message carrying a temporary IP address and a name of a basic configuration file obtained by the device from a Dynamic Host Configuration Protocol (DHCP) server. The method may also include obtaining, by the auto-deployment server, the basic configuration file corresponding to the name of the basic configuration file from basic configuration files stored in the auto-deployment server, and obtaining a Media Access Control (MAC) address of the device according to the basic configuration file and the temporary IP address. The method may further include obtaining, by the auto-deployment server, a baseline startup configuration file of the device according to the MAC address. The method may still further include deploying, by the auto-deployment server, the baseline startup configuration file to the device. According to an example, the auto-deployment server may further trigger the device to execute the baseline startup configuration file to make the baseline startup configuration file valid. According to another example, the auto-deployment server may deploy the baseline startup configuration file to the device and the device may automatically execute the baseline startup configuration file to make the baseline startup configuration file valid.

Also disclosed herein is a device auto-deployment system including a device and a DHCP server. The auto-deployment system may further include an auto-deployment server and a TFTP server. In this method, a temporary IP address allocation segment, an IP address or domain name of the TFTP server and a name of a basic configuration file may be configured in the DHCP server. An auto-deployment file and the basic configuration file may be configured in the auto-deployment server. The auto-deployment file may record auto-deployment tuple information, which may include a MAC address of the device, an IP address and mask, and a name of a baseline startup configuration file. The auto-deployment tuple information may further define a corresponding relationship between a MAC address and a name of a baseline startup configuration file. The TFTP server may save basic configuration files.

When the auto-deployment server receives a notification message from the TFTP server, the auto-deployment server may search for a corresponding basic configuration file according to the name of the basic configuration file in the notification message. The auto-deployment server may also obtain the MAC address of the device according to the basic configuration file and a temporary IP address in the notification message, may search for the corresponding auto-deployment tuple information according to the MAC address, may obtain a name of a baseline startup configuration file of the device according to the auto-deployment tuple information, and may obtain the baseline startup configuration file according to the name of the baseline startup configuration file. After the auto-deployment server obtains the baseline startup configuration file of the device, the auto-deployment server may deploy the baseline startup configuration file to the device and may trigger the device to execute the baseline startup configuration file to enhance auto-deployment efficiency of an active device.

Referring to FIG. 1, there is shown a schematic diagram illustrating a structure of an auto-deployment system, according to an example. The auto-deployment system is depicted as including a device 11, a DHCP server 12, a TFTP server 13, and an auto-deployment server 14.

The device 11 may broadcast a DHCP request packet to request the DHCP server 12 to allocate a temporary IP address, an IP address of the TFTP server 13, and a name of a basic configuration file, to send a basic configuration file obtaining request to the TFTP server 13, and to receive the basic configuration file from the TFTP server 13. The basic configuration file obtaining request may carry the temporary IP address of the device 11 and the name of the basic configuration file.

In this example of the present disclosure, the device 11 may be a to-be-configured device, that is, a device that is yet to be configured.

The DHCP server 12 may store a temporary IP address allocation segment, the IP address or a domain name of the TFTP server 13, and the name of the basic configuration file and may send the temporary IP address, the IP address or the domain name of the TFTP server 13, and the name of the basic configuration file to the device 11 when the DHCP server 12 receives the DHCP request packet from the device 11.

The TFTP server 13 may store basic configuration files, may record the name of the basic configuration file and the temporary IP address in the basic configuration file obtaining request when the TFTP server 13 receives the basic configuration file obtaining request from the device 11, may send the corresponding basic configuration file to the device 11 according to the name of the basic configuration file, and may send a notification message carrying the temporary IP address of the device and the name of the basic configuration file obtained by the device to the auto-deployment server 14.

The auto-deployment server 14 may store an auto-deployment file and basic configuration files. The auto-deployment file may record auto-deployment tuple information. The auto-deployment tuple information may include the MAC address, IP address and mask of the device, and the name of the baseline startup configuration file. The auto-deployment tuple information may further define a corresponding relationship between a MAC address and the name of a baseline startup configuration file. The auto-deployment server 14 may receive the notification message from the TFTP server, may obtain the basic configuration file corresponding to the name of the basic configuration file from the saved basic configuration files, may obtain the MAC address of the device according to the basic configuration file and the temporary IP address in the notification message, may search for a name of a baseline startup configuration file corresponding to the MAC address according to the MAC address and the corresponding relationship between the MAC address and the name of the baseline startup configuration file, and may obtain the baseline startup configuration file according to the name of the baseline startup configuration file. The baseline startup configuration file may be deployed to the device 11 and the device 11 may be triggered to execute the baseline startup configuration file.

In this example, if the DHCP server saves the domain name of the TFTP server 13, the auto-deployment system may further include a DNS 15.

The DNS 15, if included, may parse the domain name of the TFTP server 13 allocated to the device 11 to obtain the IP address of the TFTP server 13 and send the IP address of the TFTP server 13 to the device 11.

Figure 2:
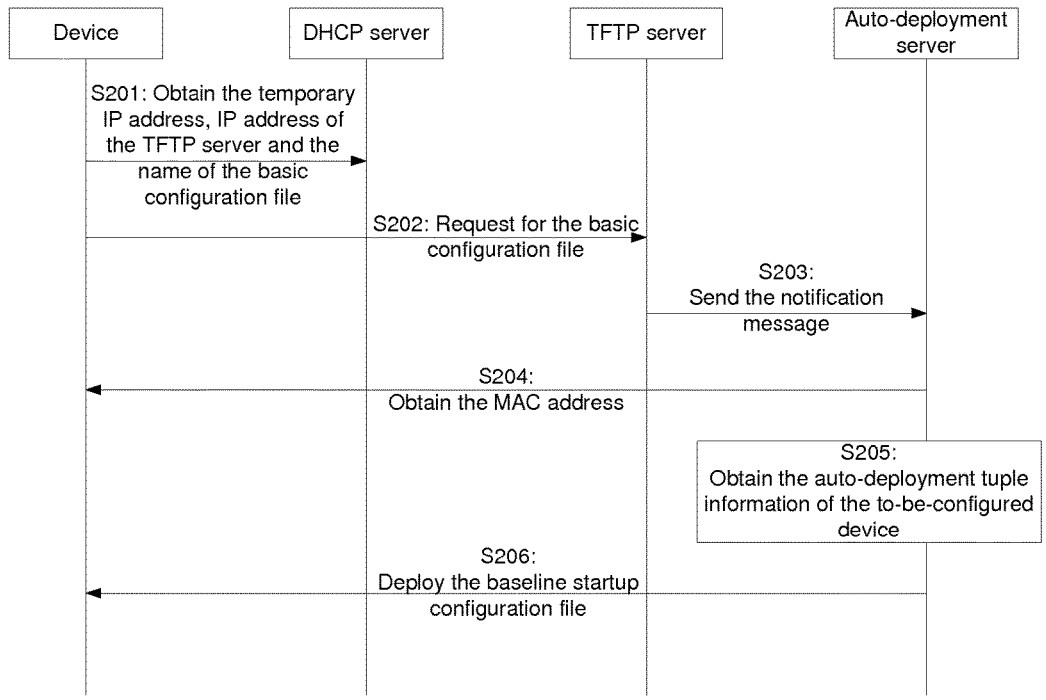
FIG. 2 is a flow chart illustrating a method for automatically deploying a device in accordance with an example of the present disclosure.

Based on the above auto-deployment system, a process for automatically deploying the device provided by an example of the present disclosure is shown in FIG. 2. It should, however, be understood that the method depicted in FIG. 2 may be implemented in a differently configured auto-deployment system.

Referring to FIG. 2, there is shown a flow chart illustrating a method for automatically deploying a device in accordance with an example of the present disclosure. The method may include the following blocks.

In block 201, the device may obtain a temporary IP address, an IP address of the TFTP server, and a name of a basic configuration file with the DHCP protocol. According to an example, the temporary IP address allocation segment, the IP address or domain name of the TFTP server, and the name of the basic configuration file are configured in the DHCP server.

When the device starts up, the device may request the DHCP server to allocate the temporary IP address, the IP address of the TFTP server, and the name of the basic configuration file via actively broadcasting the DHCP request packet. After the DHCP server receives the DHCP request packet broadcast by the device, the DHCP server may allocate the temporary IP address, the IP address of the TFTP server, and the name of the basic configuration file to the device. If the domain name of the TFTP server is configured in the DHCP server, the DNS may parse the domain name of the TFTP server to obtain the IP address of the TFTP server.

In block 202, the device may request the TFTP server for the basic configuration file. After the device receives the temporary IP address, the IP address of the TFTP server, and the name of the basic configuration file allocated by DHCP server, the device may send the basic configuration file obtaining request to the TFTP server according to the IP address of the TFTP server. The basic configuration file obtaining request may carry the temporary IP address of the device and the name of the basic configuration file.

After the TFTP server receives the basic configuration file obtaining request from the device, the TFTP server may search for the corresponding basic configuration file according to the name of the basic configuration file in the request. The TFTP server may further record the temporary IP address of the device and the name of the basic configuration file in the basic configuration file obtaining request and may send the temporary IP address and the name of the basic configuration file to the auto-deployment server via the notification message.

The basic configuration file may include an initial SNMP or telnet parameter of the device. The device executing the basic configuration file may be accessed and configured via a SNMP or telnet mode.

After the TFTP server sends the basic configuration file to the device, the TFTP server may trigger the device to execute the basic configuration file (For example, the device is triggered to restart and the basic configuration file comes into effect). According to an example of the present disclosure, the device may automatically execute the basic configuration file to make the basic configuration file valid. After the basic configuration file comes into effect, the device may be accessed in a SNMP or telnet mode.

In block 203, the auto-deployment server may receive the notification message from the TFTP server. The notification message may carry the temporary IP address of the device and the name of the basic configuration file obtained by the device.

In block 204, the auto-deployment server may obtain the MAC address of the device. After the auto-deployment server receives the notification message from the TFTP server, the auto-deployment server may obtain the basic configuration file corresponding to the name of the basic configuration file from the basic configuration files stored in the TFTP server, may access the device in the SNMP or telnet mode according to the initial SNMP or telnet parameter in the basic configuration file, and may read the MAC address of the device.

In block 205, the auto-deployment server may obtain the auto-deployment tuple information of the device. After the auto-deployment server obtains the MAC address of the device, the auto-deployment server may search for the auto-deployment file stored in the auto-deployment server according to the MAC address of the device to obtain the auto-deployment tuple information of the device. The auto-deployment tuple information may include the MAC address, IP address and mask, and the name of the baseline startup configuration file and may further include the corresponding relationship between the MAC address and the name of the baseline startup configuration file.

In block 206, the auto-deployment server may deploy the baseline startup configuration file corresponding to the name of the baseline startup configuration file in the auto-deployment tuple information to the device and may trigger the device to execute the baseline startup configuration file. After the auto-deployment server obtains the auto-deployment tuple information of the device, the auto-deployment server may deploy the baseline startup configuration file to the device and may trigger the device to execute the baseline startup configuration file (For example, the device is triggered to restart and the baseline startup configuration file comes into effect). According to another example of the present disclosure, the auto-deployment server may deploy the baseline startup configuration file to the device and the device may automatically execute the baseline startup configuration file to make the baseline startup configuration file come into effect.

In this example of the present disclosure, in order to ensure that the baseline startup configuration file may be repeatedly used, multiple variables may be configured in the baseline startup configuration file. The multiple variables may be wildcards. In other words, when baseline startup configuration files corresponding to different devices need to be generated, corresponding variable values may be configured for the multiple variables in baseline startup configuration files.

Furthermore, in this example, the auto-deployment tuple information of the auto-deployment file configured in the auto-deployment server may further include an auto-deployment status, indicating that the corresponding device is in a waiting for deployment status or in a deployment completion status.

After the auto-deployment server obtains the auto-deployment tuple information of the device, the auto-deployment server may determine whether the device is in the waiting for deployment status or in the deployment completion status according to the auto-deployment status in the auto-deployment tuple information. If the device is in the waiting for deployment status, the baseline startup configuration file may be deployed to the device. If the device is in the deployment completion status, the device may not be deployed.

The initial auto-deployment status in the auto-deployment tuple information is the waiting for deployment status. After the auto-deployment of the device is completed, the auto-deployment server may configure the auto-deployment status in the auto-deployment tuple information as the deployment completion status.

According to an example, the auto-deployment tuple information further includes software information of the device.

After the auto-deployment server obtains the auto-deployment tuple information of the device, the auto-deployment server may deploy corresponding software for the device according to the software information in the auto-deployment tuple information.

The auto-deployment tuple information may further include the SNMP or telnet parameter. After the auto-deployment server triggers the device to execute the baseline startup configuration file, the temporary IP address, the temporary initial SNMP or temporary telnet parameter of the device may be updated as the IP address, SNMP or telnet parameter in the auto-deployment tuple information. The auto-deployment server may access the device according to the updated IP address, SNMP or telnet parameter in the SNMP or telnet mode to determine whether the device is running normally.

According to an example, the auto-deployment server may record the auto-deployment process and result, and reasons for failure, so that a user may view the recorded information to timely find problems.

After the device finishes the auto-deployment, the device may automatically join the network management system.

It should be noted that, according to an example, after the auto-deployment server receives the notification message from the TFTP server, an independent auto-deployment agent may be started up. The device may be automatically deployed with the auto-deployment agent and the auto-deployment server may automatically deploy multiple devices simultaneously.

It may be seen from the above description that, when the auto-deployment server receives a notification message from the TFTP server, the auto-deployment server may search for a corresponding basic configuration file according to the name of the basic configuration file in the notification message, may obtain the MAC address of the device according to the basic configuration file and the temporary IP address in the notification message, may search for corresponding auto-deployment tuple information according to the MAC address, may obtain the name of the baseline startup configuration file of the device according to the auto-deployment tuple information, and may obtain the baseline startup configuration file according to the name of the baseline startup configuration file. After the auto-deployment server obtains the baseline startup configuration file of the device, the auto-deployment server may deploy the baseline startup configuration file to the device. According to an example, the auto-deployment server may further trigger the device to execute the baseline startup configuration file to make the baseline startup configuration file valid and further enhance auto-deployment efficiency of the device. According to another example, the auto-deployment server may deploy the baseline startup configuration file to the device and the device may automatically execute the baseline startup configuration file to make the baseline startup configuration file valid.

According to an example, an auto-deployment server may apply the above-described method examples, as discussed in greater detail hereinbelow.

Figure 3:
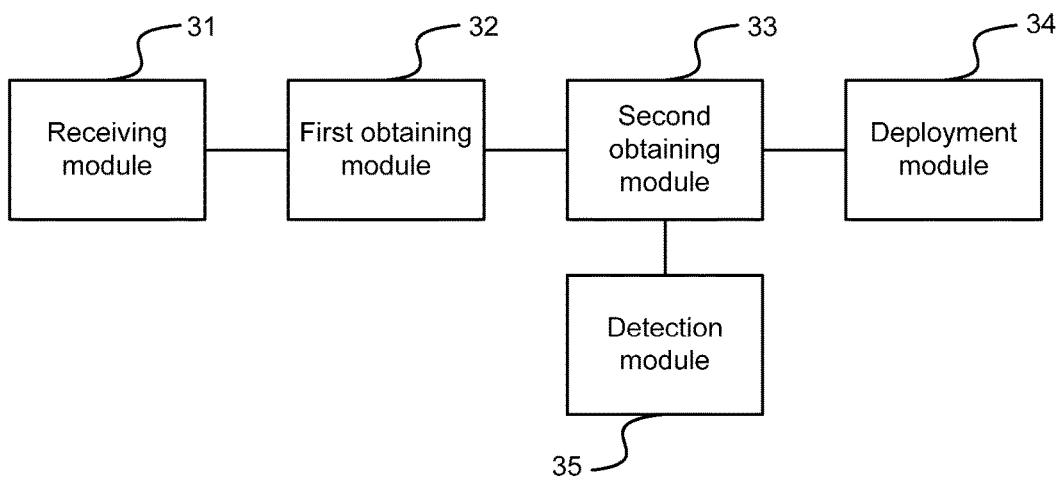
FIG. 3 is a schematic diagram illustrating the structure of an auto-deployment server in accordance with an example of the present disclosure.

With reference now to FIG. 3, there is shown a schematic diagram illustrating the structure of an auto-deployment server in accordance with an example of the present disclosure. The auto-deployment server may be implemented in an auto-deployment system including a DHCP server. Furthermore, the auto-deployment system may include a TFTP server.

The DHCP server may include a temporary IP address allocation segment, an IP address or domain name of a TFTP server, and a name of a basic configuration file. The auto-deployment server may include an auto-deployment file and basic configuration files. The auto-deployment file may record auto-deployment tuple information of the device. The auto-deployment tuple information may include a MAC address, an IP address and mask, and a name of a baseline startup configuration file, and may further define a corresponding relationship between the MAC address and the name of the baseline startup configuration file. The TFTP server may store the basic configuration files.

The auto-deployment server may include a receiving module 31, a first obtaining module 32, a second obtaining module 33, and a deployment module 34.

The receiving module 31 may obtain a notification message from the TFTP server. The notification message may carry the temporary IP address of the device and the name of the basic configuration file obtained by the device. The TFTP server may send the notification message after the TFTP server receives the basic configuration file obtaining request from the device and may send the corresponding basic configuration file to the device.

The first obtaining module 32 may search for the corresponding basic configuration file according to the name of the basic configuration file and may obtain the MAC address of the device according to the basic configuration file and the temporary IP address.

The second obtaining module 33 may search for the auto-deployment tuple information according to the MAC address, may obtain the name of the baseline startup configuration file according to the auto-deployment tuple information, and may obtain the baseline startup configuration file according to the name of the baseline startup configuration file.

The deployment module 34 may deploy the baseline startup configuration file to the device and may trigger the device to execute the baseline startup configuration file.

The basic configuration file may include an initial SNMP parameter or a telnet parameter of the device. The device running the basic configuration file may be accessed and configured in an SNMP or telnet mode.

The first obtaining module 32 may access the device in the SNMP or telnet mode according to the temporary IP address and one of the initial SNMP and telnet parameter and may read the MAC address of the device.

The auto-deployment tuple information may further include an auto-deployment status, indicating whether the device is in the waiting for deployment status or a deployment completion status.

The deployment module 34 may deploy the baseline startup configuration file to the device if the second obtaining module 33 finds that the auto-deployment status in the auto-deployment tuple information is the waiting for deployment status. The initial auto-deployment status in the auto-deployment tuple information may be the waiting for deployment status. After the auto-deployment is finished, the auto-deployment server may configure the auto-deployment status as the deployment completion status.

The auto-deployment tuple information may further include software information of the device.

The deployment module 34 may further obtain the software information of the device according to the auto-deployment tuple information after the second obtaining module 33 finds the auto-deployment tuple information corresponding to the MAC address and may deploy the corresponding software for the device according to the software information of the device.

The auto-deployment tuple information may further include an SNMP parameter or a telnet parameter.

The auto-deployment server may further include a detection module 35 to access the device according to the IP address and one of the SNMP parameter and the telnet parameter to determine whether the device is running normally.

It should be understood by a person of ordinary skill in the art that the modules of this example may be included in one or multiple devices different from that of the present disclosure. In addition, the modules in the above example may be combined into one module and may also be split into multiple sub-modules without departing from a scope of the auto-deployment server depicted in FIG. 3.

Figure 4:
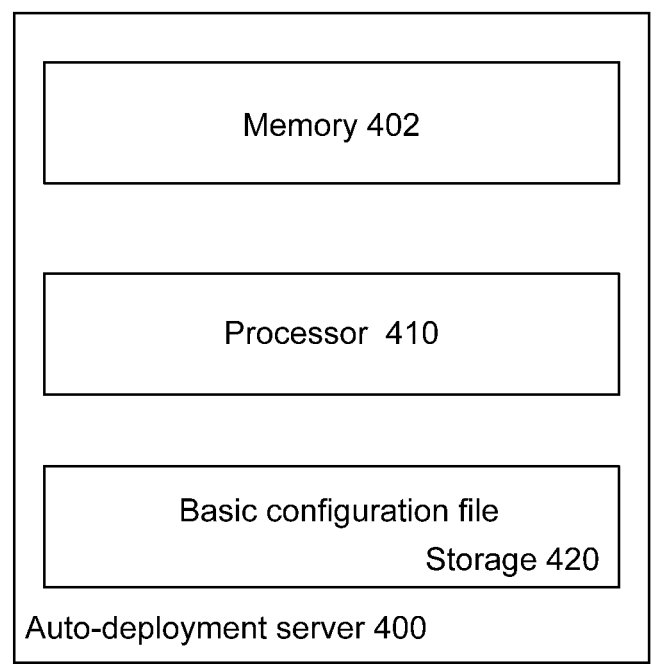
FIG. 4 is a schematic diagram illustrating a structure of an auto-deployment server in accordance with another example of the present disclosure.

As shown in FIG. 4, there is depicted a schematic diagram illustrating a structure of an auto-deployment server in accordance with another example of the present disclosure.

The auto-deployment server 400 includes: a non-transitory memory 402, a processor 410, and a storage 420. The storage 420 is to store basic configuration files and the memory 402 is to store machine readable instructions. The machine readable instructions, when executed by the processor 410, may cause the processor 410 to receive from a Trivial File Transfer Protocol (TFTP) server, a notification message carrying a temporary IP address and a name of a basic configuration file obtained by a device from a Dynamic Host Configuration Protocol (DHCP) server, obtain the basic configuration file corresponding to the name of the basic configuration file from the storage 420 and obtain a Media Access Control (MAC) address of the device according to the basic configuration file and the temporary IP address, obtain a baseline startup configuration file of the device according to the MAC address and deploy the baseline startup configuration file to the device. According to an example, the processor 410 may further trigger the device to execute the baseline startup configuration file to make the baseline startup configuration file valid. According to another example, the processor 410 may deploy the baseline startup configuration file to the device and the device may automatically execute the baseline startup configuration file to make the baseline startup configuration file valid. The basic configuration file may include an initial Simple Network Management Protocol (SNMP) parameter or a telnet parameter of the device.

The processor 410 may further execute the machine readable instructions to access the device in an SNMP or telnet mode according to the temporary IP address and one of the initial SNMP parameter and the telnet parameter and read the MAC address of the device.

The storage 420 may further store auto-deployment tuple information including a corresponding relationship between the MAC address and the name of the baseline startup configuration file.

The processor 410 may further execute the machine readable instructions to search for the name of the baseline startup configuration file according to the MAC address and the corresponding relationship between the MAC address and the name of the baseline startup configuration file and may search for the baseline startup configuration file according to the name of the baseline startup configuration file.

The processor 410 may further execute the machine readable instructions to read the MAC address of the device from the device that has executed the basic configuration file in the SNMP or telnet mode according to the temporary IP address and one of the initial SNMP parameter and the telnet parameter.

The storage 420 may further store the auto-deployment tuple information including an auto-deployment status.

The processor 410 may further execute the machine readable instructions to deploy the baseline startup configuration file to the device when finding that the auto-deployment status is in a waiting for deployment status.

The storage 420 may further store the auto-deployment tuple information including a SNMP parameter or a telnet parameter.

After the device executes the baseline startup configuration file, the processor 410 may further execute the machine readable instructions to update the temporary IP address as an IP address and access the device according to the IP address and one of the SNMP parameter and the telnet parameter to determine whether the device is running normally.

Some or all of the operations set forth in the examples disclosed herein may be contained as utilities, programs, or subprograms, in any desired computer accessible medium. The operations may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method, comprising:
   receiving, at an auto-deployment server, a notification message from a Trivial File Transfer Protocol (TFTP) server, wherein the notification message carries a temporary IP address and a name of a basic configuration file provided by a Dynamic Host Configuration Protocol (DHCP) server;
   obtaining, by the auto-deployment server, the basic configuration file from stored basic configuration files wherein: the basic configuration file comprises an initial Simple Network Management Protocol (SNMP) parameter or a telnet parameter of the device;
   obtaining a Media Access Control (MAC) address of a device according to the basic configuration file and the temporary IP address by:
      accessing the device in an SNMP mode or a telnet mode according to the temporary IP address and the initial SNMP parameter or the telnet parameter; and
      reading the MAC address of the device;
   obtaining, by the auto-deployment server, a baseline startup configuration file of the device according to the MAC address;
   deploying, by the auto-deployment server, the baseline startup configuration file to the device; and
   triggering, by the auto-deployment server, the device to execute the baseline startup configuration file.

2. The method according to claim 1, wherein obtaining the baseline startup configuration file of the device according to the MAC address comprises:
   searching for a name of the baseline startup configuration file according to the MAC address and a corresponding relationship between the MAC address and the name of the baseline startup configuration file; and
   searching for the baseline startup configuration file according to the name of the baseline startup configuration file.

3. The method according to claim 1, wherein obtaining the MAC address of the device according to the basic configuration file and the temporary IP address comprises:
   reading the MAC address of the device from the device after the device has executed the basic configuration file in the SNMP mode or the telnet mode according to the temporary IP address and one of the initial SNMP parameter and the telnet parameter.

4. The method according to claim 1, wherein deploying the baseline startup configuration file to the device comprises:
   deploying the baseline startup configuration file to the device if an auto-deployment status is a waiting for deployment status.

5. The method according to claim 1, further comprising:
   obtaining software information of the device from stored auto-deployment information; and
   deploying software for the device according to the software information of the device.

6. The method according claim 1, further comprising:
   updating the temporary IP address to be an IP address after the device executes the baseline startup configuration file;
   accessing the device according to the IP address and the SNMP parameter or the telnet parameter in stored auto-deployment information to determine whether the device is running normally.

7. An auto-deployment server, comprising:
   a storage to store basic configuration files;
   a memory to store machine readable instructions; and
   a processor to execute the machine readable instructions to:
      receive a notification message from a Trivial File Transfer Protocol (TFTP) server, wherein the notification message carries a temporary IP address and a name of a basic configuration file obtained by a device from a Dynamic Host Configuration Protocol (DHCP) server;
      obtain the basic configuration file from the storage wherein the basic configuration file comprises an initial Simple Network Management Protocol (SNMP) parameter or a telnet parameter of the device;
      obtain a Media Access Control (MAC) address of the device according to the basic configuration file and the temporary IP address by:
         accessing the device in an SNMP mode or a telnet mode according to the temporary IP address and the initial SNMP parameter or the telnet parameter; and
         reading the MAC address of the device;
      obtain a baseline startup configuration file of the device according to the MAC address; and
      deploy the baseline startup configuration file to the device; and
      trigger the device to execute the baseline startup configuration file.

8. The auto-deployment server according to claim 7, wherein the storage is further to store auto-deployment information comprising a correspondence between the MAC address and a name of the baseline startup configuration file.

9. The auto-deployment server according to claim 7, wherein the processor is further to execute the machine readable instructions to read the MAC address of the device from the device after the device has executed the basic configuration file in the SNMP mode or the telnet mode according to the temporary IP address and one of the initial SNMP parameter and the telnet parameter.

10. The auto-deployment server according to claim 7, wherein the storage is further to store auto-deployment information comprising an auto-deployment status and wherein the processor is further to execute the machine readable instructions to deploy the baseline startup configuration file to the device if the auto-deployment status is a waiting for deployment status.

11. The auto-deployment server according to claim 7, wherein the storage is further to store auto-deployment tuple information comprising a SNMP parameter or a telnet parameter and wherein, after the device executes the baseline startup configuration file, the processor is further to execute the machine readable instructions to update the temporary IP address as an IP address and access the device according to the IP address and one of the SNMP parameter and the telnet parameter to determine whether the device is running normally.

12. The auto-deployment server according to claim 7, wherein the processor to obtain the basic configuration file from the storage is further to obtain the basic configuration file from the storage based on the name of the basic configuration file received in the notification message.

13. The auto-deployment server according to claim 8, wherein the processor is further to execute the machine readable instructions to search for the name of the baseline startup configuration file according to the MAC address and the correspondence between the MAC address and the name of the baseline startup configuration file.

14. The auto-deployment server according to claim 13, wherein the processor is further to execute the machine readable instructions to search for the baseline startup configuration file according to the name of the baseline startup configuration file.

15. The auto-deployment server according to claim 7, wherein the processor is further to execute the machine readable instructions to access the device in the SNMP mode or the telnet mode after the basic configuration file comes into effect on the device.

16. The auto-deployment server according to claim 7, wherein the basic configuration file comes into effect on the device by restarting the device and executing the basic configuration file at startup of the device.

\* \* \* \* \*